United States Patent [19]

Westall et al.

[11] Patent Number: 4,490,416

[45] Date of Patent: Dec. 25, 1984

[54] ORGANOSILOXANE-OXYALKYLENE COPOLYMERS

[75] Inventors: Stephen Westall; James W. White, both of Barry, Wales

[73] Assignee: Dow Corning Limited, Barry, Wales

[21] Appl. No.: 610,538

[22] Filed: May 15, 1984

[51] Int. Cl.³ .............................................. B05D 3/02
[52] U.S. Cl. .................................... 427/387; 528/17; 528/18; 528/19; 528/34; 556/446; 556/457
[58] Field of Search .................. 556/457, 446; 528/34, 528/19, 18, 17; 427/387

[56] References Cited

U.S. PATENT DOCUMENTS 3,600,418 8/1971 Bailey et al. ........................ 556/446

FOREIGN PATENT DOCUMENTS 32310 9/1980 European Pat. Off. .
1290687 6/1972 United Kingdom .

*Primary Examiner*—Melvyn I. Marquis
*Attorney, Agent, or Firm*—George A. Grindahl

[57] ABSTRACT

Organosiloxane-oxyalkylene copolymers in which at least one silicon atom of an organosiloxane unit has attached thereto a group

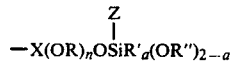

in which X is a divalent hydrocarbon group, R is an alkylene group, n is an integer of at least 2, Z is an organic substituent containing an epoxy group, R' is lower alkyl, vinyl or phenyl, R" is alkyl or alkoxyalkyl and a is 0 or 1, at least 40 percent of the total substituents in the copolymer being methyl.

The copolymers are film forming and may be applied to continuous or porous substrates from aqueous or non-aqueous solutions.

6 Claims, No Drawings

ORGANOSILOXANE-OXYALKYLENE COPOLYMERS

This invention relates to copolymers comprising organosiloxane units and oxyalkylene units, and also relates to a process for preparing such copolymers.

Copolymers comprising siloxane units and oxyalkylene units are now well known and have been commercially employed in applications such as surfactants for polyurethane foams and as textile fibre lubricants. In U.K. Pat. No. 1,290,687 there are disclosed siloxane-polyoxyalkylene block copolymers in which there are present methoxy groups attached to silicon atoms. It is stated in the said patent that a preferred application of the block copolymers is in the treatment of hydrophobic fibres to improve their soil resistance. European patent application No. 32 310 also discloses copolymers containing siloxane units, oxyalkylene units and silicon-bonded hydrolysable groups, and the use of such copolymers for treating textiles. In the above described prior art copolymers the methoxy groups or hydrolysable groups are attached to a silicon atom in the siloxane chain either directly or by way of an aliphatic hydrocarbon linkage.

According to the present invention there are provided organosiloxane-oxyalkylene copolymers wherein at least one silicon atom of an organosiloxane unit has attached thereto a group represented by the general formula

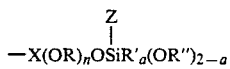

wherein X represents a divalent hydrocarbon group having from 2 to 8 carbon atoms, R represents an alkylene group having from 2 to 4 carbon atoms, n is an integer of at least 2, Z represents an organic group composed of carbon, hydrogen and oxygen and having therein at least one epoxy group, R' represents a lower alkyl, vinyl or phenyl group, R" represents an alkyl or an alkoxyalkyl group having less than 7 carbon atoms and a has a value of 0 or 1, the remaining silicon-bonded substituents in the organosiloxane units being selected from hydrogen atoms, monovalent hydrocarbon groups and groups represented by the general formula —X(OR)$_n$OG wherein X and R are as hereinabove defined and G represents a hydrogen atom, a monovalent hydrocarbon group having from 1 to 10 carbon atoms or an acyl group having from 2 to 6 carbon atoms, at least 40 percent of the total substituents bonded to siloxane silicon atoms in the copolymer being methyl.

In the general formula above —(OR)$_n$— represents an oxyalkylene block having at least 2, preferably from 2 to 50 oxyalkylene units OR. The oxyalkylene units are preferably oxyethylene or oxypropylene or combinations of the two, for example —(OC$_2$H$_4$)$_6$(OC$_3$H$_6$)$_6$—. The group X which links the oxyalkylene block to the siloxane silicon atom may have from 2 to 8 carbon atoms, but, in view of the more ready availability of the polyoxyalkylene precursor, is preferably the propylene group —(CH$_2$)$_3$.

The substituent Z is an epoxidised monovalent organic group composed of carbon, hydrogen and oxygen. Examples of such groups include the group

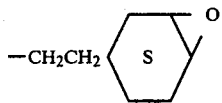

and those represented by the general formula

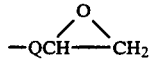

wherein Q represents a divalent hydrocarbon group e.g. ethylene, butylene, phenylene, cyclohexylene and

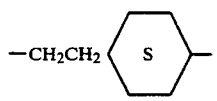

or an ether oxygen-containing group such as —CH$_2$CH$_2$OCH$_2$CH$_2$ and —CH$_2$CH$_2$OCH(CH$_3$)CH$_2$—. Preferably Z represents the group

As the R" groups there may be present any alkyl or alkoxyalkyl group having less than 7 carbon atoms e.g. methyl, ethyl, propyl, methoxyethyl and ethoxyethyl, the preferred copolymers being those wherein R" represents methyl, ethyl or methoxyethyl. The R' groups, when present, may be C$_{1-4}$ alkyl, vinyl or phenyl.

At least one of the above oxyalkylene-containing groups should be present in the copolymer. The number present in any particular case will depend upon such factors as the size of the copolymer molecule desired and the balance sought between the properties bestowed by the siloxane and oxyalkylene portions. The remaining substituents on the siloxane silicon atoms may be selected from hydrogen atoms, monovalent hydrocarbon groups e.g. ethyl, propyl, 2,4,4-trimethylpentyl, vinyl, allyl and phenyl and silicon-free oxyalkylene groups of the formula —X(OR)$_n$OG, wherein G is for example ethyl, butyl or acetyl; with the proviso that at least 40 percent of the total siloxane silicon-bonded substituents are methyl groups. The preferred copolymers of this invention are those wherein the oxyalkylene groups (OR)$_n$ are oxyethylene and comprise at least 35% of the total weight of the copolymer.

The copolymers of this invention may take any of the molecular configurations available to such copolymers provided such configuration is consistent with the presence of terminal silyl groups on the oxyalkylene-containing group or groups. For example, they may be of the ABA configuration wherein A represents the

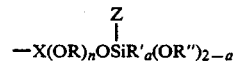

group and B represents a linear siloxane portion e.g. —(M$_2$SiO)$_b$ wherein each M individually represents an organic substituent such as —CH$_3$ and b is an integer of at least 2. Alternatively the copolymer may be of the so-called "rake" configuration wherein the oxyalkylene-containing groups are pendant from a siloxane chain as in

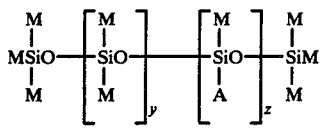

in which y is zero or an integer and z is an integer. According to yet another configuration the oxyalkylene-containing (A) groups may be present both in the pendant positions and attached to the terminal silicon atoms of the siloxane chain. It will thus be apparent that in addition to the siloxane units having oxyalkylene groups attached thereto the copolymers of this invention may also comprise monofunctional M$_3$SiO$_{\frac{1}{2}}$ units, difunctional M$_2$SiO and trifunctional MSiO$_{3/2}$ units. If desired, small proportions of tetrafunctional SiO$_2$ units may also be present.

The copolymers of this invention can be obtained by reacting together (A) an organosiloxane-oxyalkylene copolymer wherein at least one silicon atom of an organosiloxane unit has attached thereto a group of the general formula

the remaining silicon-bonded substituents in the organosiloxane units being selected from hydrogen atoms, monovalent hydrocarbon groups and groups represented by the general formula —X(OR)$_n$OG, at least 40 percent of the total substituents bonded to siloxane silicon atoms in the copolymer being methyl groups, and (B) an organosiloxane

wherein X, R, Z, R', R'' and a are as hereinbefore defined and G represents a monovalent hydrocarbon group having from 1 to 10 carbon atoms or an acyl group having from 2 to 6 carbon atoms.

Organosiloxane-oxyalkylene copolymers (A) employed in the said preparative process are a known class of materials. Such copolymers and methods for their preparation are described in, for example, British Pat. Nos. 802,467 and 1,143,206. The silanes (B) are also known substances and have been disclosed in, for example, British Pat. No. 834,326.

Some reaction between (A) and (B) to form the organosiloxane-oxyalkylene copolymers of this invention is believed to occur at normal ambient temperatures. It is preferred, however, to expedite the reaction by the use of higher temperatures, for example, from about 60° C. to 180° C. If desired the reaction may be carried forward in the presence of a transesterification catalyst, for example zinc tetrafluoroborate, an organic tin compound e.g. stannous octoate or a titanium compound e.g. tetrabutyl titanate. Where subsequent reaction of the copolymer via the epoxy groups is envisaged the preferred catalysts are those which also function to open the epoxy ring e.g. zinc tetrafluoroborate.

The relative molar proportions of the reactants employed may be varied to achieve substantially complete reaction of the available COH groups, or to induce only partial reaction whereby the resulting copolymer product contains both silylated and non-silylated oxyalkylene groups.

The molecular weight of the copolymers of this invention may vary widely and the copolymers may range from mobile liquids to gummy or waxy solids. When a sufficient proportion of oxyethylene units is present the copolymers are water-soluble. The copolymers may therefore be formed into curable films on continuous, porous or fibrous substrates from aqueous or non aqueous solutions. Curing of the copolymers into films will take place in the absence of a curing catalyst. It is, however, generally preferred to accelerate the cure by the addition of a siloxane condensation catalyst. A wide variety of such catalysts are known and include, for example acids, bases and metal organic compounds such as the metal carboxylates e.g. dibutyltin dilaurate, stannous octoate and zinc octoate and titanium alkoxides and chelates. Certain substances e.g. zinc tetrafluoroborate and stannous octoate can function both as a transesterification catalyst during the preparation of the siloxane-oxyalkylene copolymer and subsequently as a curing catalyst therefor.

It is also preferred to effect drying and curing of the films at elevated temperatures. The actual temperature employed will depend to some extent on the nature and heat resistance of the substrate, temperatures in the range from about 80° C. to about 180° C. being generally appropriate.

If desired the copolymers of the invention may be mixed with fillers, pigments and other additives to produce compositions curable to rubbery solids having paintable surfaces.

The following examples in which Me represents methyl illustrate the invention.

EXAMPLE 1

To a 20 liter split-necked flask equipped with a stirrer, condenser and thermometer was charged 12,500 g of a siloxane-oxyalkylene copolymer of average composition [HO(CH$_2$CH$_2$O)$_{12}$(CH$_2$)$_3$SiMe$_2$O$_{0.5}$]$_2$(SiMe$_2$O)$_{14}$. The flask was heated to 90° C. and a 40% by weight aqueous solution (26 ml) of zinc tetrafluoroborate added and dissolved with stirring. This was followed by the addition over 25 minutes of the silane.

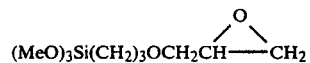

(2458.7 g), the reaction mixture then being maintained at 90° C. for a further 2 hours. On cooling there was obtained 14,870 g (99.5%) of a clear, amber, water-soluble liquid.

When an aqueous solution (15% by weight) of the liquid was coated on to aluminum and dried at 150° C. for 3 minutes a crosslinked, water-insoluble, hydrophilic film was obtained.

EXAMPLE 2

192 G of the siloxane-oxyalkylene copolymer employed in Example 1 and 1 gm of concentrated hydrochloric acid were heated with stirring to 90° C. 37.8 G of the silane

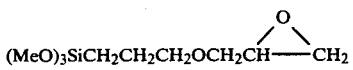

were added and the mixture maintained at 90° C. for 2 hours. On cooling there was obtained 223 g (97%) of a clear, amber, water-soluble liquid. When an aqueous solution (15% by weight) of the liquid was coated onto aluminium and dried for 3 minutes at 150°0 C. a crosslinked 25 water insoluble film was obtained.

EXAMPLE 3

Employing the procedure of Example 1 a siloxane-oxyalkylene copolymer (240 g) of average composition

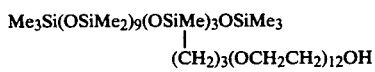

and the silane

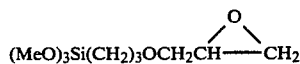

(70.8 g) were reacted at 90°–100° C. in the presence of a 40% by weight aqueous solution (3 ml) of zinc tetrafluoroborate.

The reaction product (304 g) was a clear, amber-coloured liquid which formed clear aqueous solutions. On drying these solutions (10% by weight) at 150° C. for 3 minutes clear crosslinked hydrophilic films were obtained.

EXAMPLE 4

150.9 G of a siloxane-oxyalkylene copolymer having the average composition

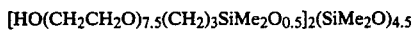

was heated to 80° C. with stirring. A 40% by weight aqueous solution (2 ml) of $Zn(BF_4)_2$ was then added, followed by 47.2 g of the silane

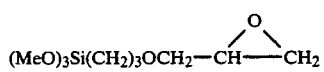

The mixture was maintained at 80° C. for 2 hours and then allowed to cool. A slightly hazy water-soluble liquid was obtained. When a 10% by weight aqueous solution of this liquid was dried at 150° C. a crosslinked, water-insoluble film resulted.

That which is claimed is:

1. An organosiloxane-oxyalkylene copolymer wherein at least one silicon atom of an organosiloxane unit has attached thereto a group represented by the general formula

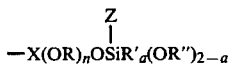

wherein X represents a divalent hydrocarbon group having from 2 to 8 carbon atoms, R represents an alkylene group having from 2 to 4 carbon atoms, n is an integer of at least 2, Z represents an organic group composed of carbon, hydrogen and oxygen and having therein at least one epoxy group, R' represents a lower alkyl, vinyl or phenyl group, R" represents an alkyl or an alkoxyalkyl group having less than 7 carbon atoms and a has a value of 0 or 1, the remaining silicon-bonded substituents in the organosiloxane units being selected from hydrogen atoms, monovalent hydrocarbon groups and groups represented by the general formula

wherein X and R are as hereinabove defined and G represents a hydrogen atom, a monovalent hydrocarbon group having from 1 to 10 carbon atoms or an acyl group having from 2 to 6 carbon atoms, at least 40 percent of the total substituents bonded to siloxane silicon atoms in the copolymer being methyl groups.

2. An organosiloxane-oxyalkylene copolymer as claimed in claim 1 wherein the OR units are selected from oxyethylene units, oxopropylene units and mixtures of such units.

3. An organosiloxane-oxyalkylene copolymer as claimed in claim 1 wherein R" represents a group selected from methyl, ethyl and methoxyethyl groups.

4. A process for the preparation of an organosiloxane-oxyalkylene copolymer as defined in claim 1 which comprises reacting together (A) an organosiloxane-oxyalkylene copolymer wherein at least one silicon atom of an organosiloxane unit has attached thereto a group represented by the general formula

the remaining silicon-bonded substituents in the organosiloxane units being selected from hydrogen atoms, monovalent hydrocarbon groups and groups represented by the general formula

at least 40 percent of the total substituents bonded to siloxane silicon atoms in the copolymer being methyl groups, and (B) an organosilane

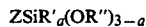

wherein X, R, Z, R', R" and a are as defined in claim 1 and G represents a monovalent hydrocarbon group having from 1 to 10 carbon atoms or an acyl group having from 2 to 6 carbon atoms.

5. A process as claimed in claim 4 wherein the reaction is carried out in the presence of a transesterification catalyst.

6. A process for coating a substrate which comprises applying thereto an organosiloxane-oxyalkylene copolymer as defined in claim 1 and thereafter curing the applied copolymer.

* * * * *

UNITED STATES PATENT AND TRADEMARK OFFICE
CERTIFICATE OF CORRECTION

PATENT NO. : 4,490,416
DATED : December 25, 1984
INVENTOR(S) : Stephen Westall; James W. White It is certified that error appears in the above-identified patent and that said Letters Patent is hereby corrected as shown below:

In Column 3, line 38, "organosiloxane" should read -- organosilane --.

In Column 4, line 65, "G" should read -- g --.

In Column 4, line 67, "G" should read -- g --.

In Column 5, line 11, "150°0" should read -- 150° --.

In Column 5, line 42, "G" should read -- g --.

In Column 6, line 29, "oxopropylene" should read -- oxypropylene --.

In Column 6, line 40, "-(OR)$_n$OH" should read -- -X(OR)$_n$OH --.

Signed and Sealed this

Ninth Day of April 1985

[SEAL]

Attest:

DONALD J. QUIGG

Attesting Officer     Acting Commissioner of Patents and Trademarks